(12) United States Patent  
Shimizu

(10) Patent No.: US 6,591,924 B2
(45) Date of Patent: Jul. 15, 2003

(54) METHOD AND APPARATUS FOR CUTTING OFF FUEL OF A FUEL CELL VEHICLE

(75) Inventor: Kiyoshi Shimizu, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 40 days.

(21) Appl. No.: 09/870,744

(22) Filed: Jun. 1, 2001

(65) Prior Publication Data

US 2001/0050189 A1 Dec. 13, 2001

(30) Foreign Application Priority Data

Jun. 12, 2000 (JP) ........................................ 2000-176031

(51) Int. Cl.$^7$ ................................................ B60K 1/00
(52) U.S. Cl. .................... 180/65.1; 180/279; 180/282; 180/284; 429/22; 429/23
(58) Field of Search ............................. 180/65.1, 277, 180/274, 284, 279, 282; 429/22, 23, 13

(56) References Cited

U.S. PATENT DOCUMENTS

| 3,743,849 | A | * | 7/1973 | Iwata ............................ 180/279 |
| 4,904,547 | A | * | 2/1990 | Mizumoto et al. ............ 429/22 |
| 5,248,566 | A | * | 9/1993 | Kumar et al. ................. 429/19 |
| 5,327,990 | A | * | 7/1994 | Busquets ...................... 180/271 |
| 5,346,778 | A | * | 9/1994 | Ewan et al. ................... 429/19 |
| 5,389,824 | A | * | 2/1995 | Moroto et al. ................ 180/283 |
| 5,483,447 | A | * | 1/1996 | Jeenicke et al. .............. 180/274 |
| 5,515,939 | A | * | 5/1996 | Korall et al. .................. 180/283 |
| 5,771,476 | A | * | 6/1998 | Mufford et al. ............... 180/65.1 |
| 5,816,358 | A | * | 10/1998 | Adler et al. .................... 180/279 |
| 5,900,330 | A | * | 5/1999 | Kagatani ........................ 429/17 |
| 6,116,363 | A | * | 9/2000 | Frank ............................. 180/65.2 |
| 6,211,643 | B1 | * | 4/2001 | Kagatani ........................ 320/101 |
| 6,354,261 | B1 | * | 3/2002 | Lassiter ....................... 123/198 D |
| 6,379,828 | B1 | * | 4/2002 | Worth ............................ 429/13 |
| 6,393,354 | B1 | * | 5/2002 | Scheffler et al. .............. 429/12 |
| 6,447,939 | B1 | * | 9/2002 | Iwasaki ......................... 180/65.3 |
| 6,459,231 | B1 | * | 10/2002 | Kagatani ........................ 320/101 |
| 6,488,345 | B1 | * | 12/2002 | Woody et al. ................. 303/152 |
| 6,502,533 | B1 | * | 1/2003 | Meacham ...................... 123/3 |

FOREIGN PATENT DOCUMENTS

JP 06-046502 2/1994

* cited by examiner

Primary Examiner—Lesley D. Morris
Assistant Examiner—Paul Royal, Jr.
(74) Attorney, Agent, or Firm—Arent Fox Kintner Plotkin & Kahn

(57) ABSTRACT

The occurrence of degradation and damage to a fuel cell when power supply to accessories for driving the fuel cell is stopped, is prevented. Respective collision judgment sections read in an acceleration signal output from corresponding acceleration sensors and judge if the acceleration signal is greater than a predetermined first threshold acceleration, and if the judgment result is "YES", close a hydrogen control valve. They then judge if the acceleration signal exceeds a predetermined second threshold acceleration greater than the first threshold acceleration, and if the judgment result is "YES", stop power supply from a power storage unit to an air compressor for driving the fuel cell.

6 Claims, 6 Drawing Sheets

METHOD AND APPARATUS FOR CUTTING OFF FUEL OF A FUEL CELL VEHICLE

BACKGROUND OF THE INVENTION

1. Field of the Invention

The present invention relates to a method and apparatus for cutting off fuel of a fuel cell vehicle, and in particular relates to technology for cutoff processing of fuel supply following stopping of power supply to accessories such as an air compressor used for driving a fuel cell.

2. Description of the Related Art

Conventionally, as a power supply cutoff device mounted on a vehicle, there is known a power supply cutoff device for an electric vehicle as disclosed for example in Japanese Unexamined Patent Application, First Publication No. Hei 6-46502. In this electric vehicle, the vehicle is driven by electric power supplied from a drive power supply, and in the case where the power supply cutoff device detects a vehicle abnormality such as a vehicle collision or near miss with an obstacle, or a short circuit in the drive power supply, or in the case where there is a high likelihood of an abnormality occurring, this cuts off the output from the drive power supply.

In such a power supply cutoff device, there is provided an acceleration sensor for detecting acceleration (or deceleration) of the vehicle, and collision judgment is performed by detecting an acceleration change of the vehicle by means of an acceleration signal output from this acceleration sensor. In the case where it is judged that a collision has occurred, then a contact point is opened for example at an output terminal end of a power storage unit such as a battery, or at an appropriate position inside the battery.

As a result, the situation where an output terminal of the battery, and the frame etc. of the vehicle come in contact and short circuit due for example to a shock or vibration at the time of a collision, or where wires are cut into due for example to deformation of the vehicle at the time of a collision giving an open circuit, is prevented.

However, in this power supply cutoff device for an electric vehicle according to the aforementioned related art example, when the power supply from the drive power supply is cutoff at the time of a vehicle collision or the like, the power supply to the accessories such as an air compressor used for driving a fuel cell is stopped.

Here, when operation of the air compressor is stopped, an appropriate time delay occurs from after the power supply is stopped until the motor for driving the air compressor actually stops. Consequently, a situation results where air continues to be supplied, as reaction gas with respect to an air electrode of the fuel cell, and as a pressure signal with respect to a pressure control valve for fuel supply. Accompanying this, fuel (hydrogen gas) of an amount corresponding to the air supply amount is supplied to the fuel electrode of the fuel cell.

At this time, if the output side of the fuel cell is cutoff with respect to the electrical load of for example the accessories for driving the fuel cell such as the motor for driving the air compressor, or the propulsion motor and the like, the output voltage from the fuel cell rises to a no load condition (for example OCV: open circuit voltage).

That is to say, since the output from the fuel cell is not extracted, the situation results where the open circuit voltage continues to be output. Furthermore, since the air compressor is stopped, the air pressure drops, and when this eventually becomes atmospheric pressure, the consumption of fuel (hydrogen gas) in the fuel cell drops so that the high pressure condition of the hydrogen gas continues.

As a result, an unbalance occurs where a tolerance in the inter-electrode pressure (that is to say between the air electrode and the fuel electrode) of the solid polymer membrane type fuel cell is exceeded, so that there is a possibility of deformation or damage of the solid polymer electrolyte membrane inside the fuel cell.

SUMMARY OF THE INVENTION

The present invention takes into consideration the above situation, with the object of providing a method and apparatus for cutting off fuel of a fuel cell vehicle which, in the case where power supply to accessories for driving the fuel cell is cutoff, can prevent the occurrence of degradation or damage to the fuel cell, and which can prevent the occurrence of an unbalance where inter-electrode pressure due to air and fuel being supplied to the fuel cell exceeds a tolerance.

In order to resolve the above problems and achieve the related object, the present invention involves: detecting (for example with acceleration sensors 23R, 24L, 25F, 26c and in step S03 in a later mentioned embodiment (the same applies hereunder)) an acceleration (for example an acceleration G) acting on a fuel cell vehicle having a fuel cell power generation system (for example a fuel cell 11 and a power storage unit 12) as a power supply, cutting off fuel supply (for example with a hydrogen cutoff valve 20 and in steps S04–S06) from a fuel supply device (for example a fuel supply section 16) to a fuel cell (for example a fuel cell 11) of the fuel cell power generation system based on the detected acceleration, and cutting off (for example by a storage unit contact breaker 19a, a propulsion motor contact breaker 19c, and in step S07–S08) at least one of a power supply line of a propulsion system (for example a propulsion motor 13, an inverter 14) of the fuel cell vehicle, and a power supply line of an accessory drive system (for example an air compressor 17, a compressor drive inverter 18) of the fuel cell power generation system, after the supply of fuel has been cutoff (for example. a cutoff control section 21), based on the detected acceleration.

As a result, at the time for example where a vehicle collision occurs, at first the power supply from the fuel cell to the load such as the propulsion motor is cut off, and also the fuel supply, that is the supply of hydrogen gas, to the fuel electrode of the fuel cell is stopped.

At this time, the pressure of the hydrogen gas in the fuel electrode of the fuel cell becomes a high pressure condition. However since air is supplied to the air electrode of the fuel cell from the fuel cell drive device such as the air compressor, the inter-electrode pressure of the solid polymer electrolyte membrane inside the fuel cell is maintained within the predetermined tolerance, and the hydrogen gas in the fuel electrode is consumed so that the pressure of the fuel electrode side is gradually reduced.

Then, by stopping at an appropriate timing, power supply from the power storage unit (for example the power storage unit 12) which constitutes the fuel cell power generation system to the fuel cell drive device, the pressure of the air on the air terminal side can be reduced so as to follow the pressure drop at the fuel electrode side, so that the pressure at both electrodes can be gradually reduced without a significant change in the inter-electrode pressure.

As a result, this can prevent for example the occurrence of deformation or damage of the solid polymer electrolyte membrane, and contribute to the prolongation of the life span of the fuel cell.

In the present invention, the construction may be such that the power supply cutoff section is operated to cutoff power supply, after delaying for a predetermined time from after operating the fuel supply cutoff section to cutoff the supply of fuel (for example the processing of a cutoff delay processing section 36c).

As a result, a delay time from operating of the fuel supply cutoff section until operating the power supply cutoff section, is set beforehand based on for example the size of the piping or manifold for the hydrogen gas, and also the power consumption in the fuel cell drive device such as the air compressor, so that the solid polymer electrolyte membrane can be even more reliably protected.

Furthermore, according to the present invention, in cutting off the supply of fuel, the construction may involve judging if the acceleration has exceeded a predetermined first threshold acceleration (for example a first threshold acceleration G1) (for example step S04), and in the case where the acceleration has exceeded the first threshold acceleration, cutting off fuel supply from the fuel supply device to the fuel cell (for example step S05, S06). Moreover in cutting off the power supply, the construction may involve judging if the acceleration has exceeded a predetermined second threshold acceleration (for example a second threshold acceleration G2) greater than the first threshold acceleration (for example step S07), and in the case where the acceleration has exceeded the second threshold acceleration, cutting off the power supply line (for example S08).

As a result, the fuel supply cutoff operation and the power supply cutoff operation can be appropriately controlled in accordance with the magnitude of the shock at the time of a vehicle collision. Hence the inter-electrode pressure of the fuel cell can be precisely controlled corresponding to collision conditions, so that the solid polymer electrolyte membrane can be even more reliably protected.

DETAILED DESCRIPTION OF THE PREFERRED EMBODIMENTS

Hereunder is a description of an embodiment of an apparatus for cutting off fuel of a fuel cell vehicle of the present invention, with reference to the appended drawings.

Figure 1:
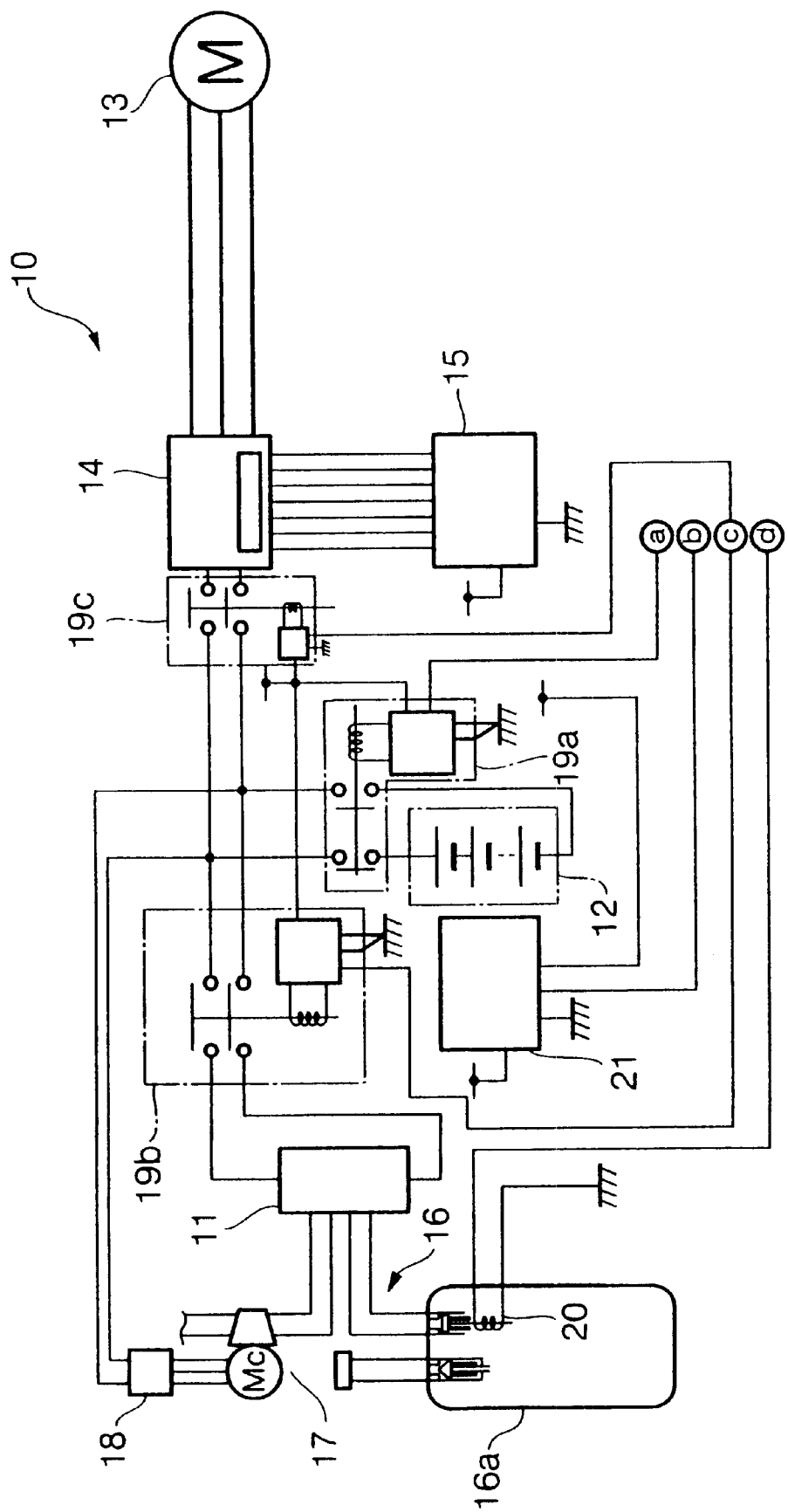
FIG. 1 is a block diagram of an apparatus for cutting off fuel of a fuel cell vehicle according to an embodiment of the present invention.
Figure 2:
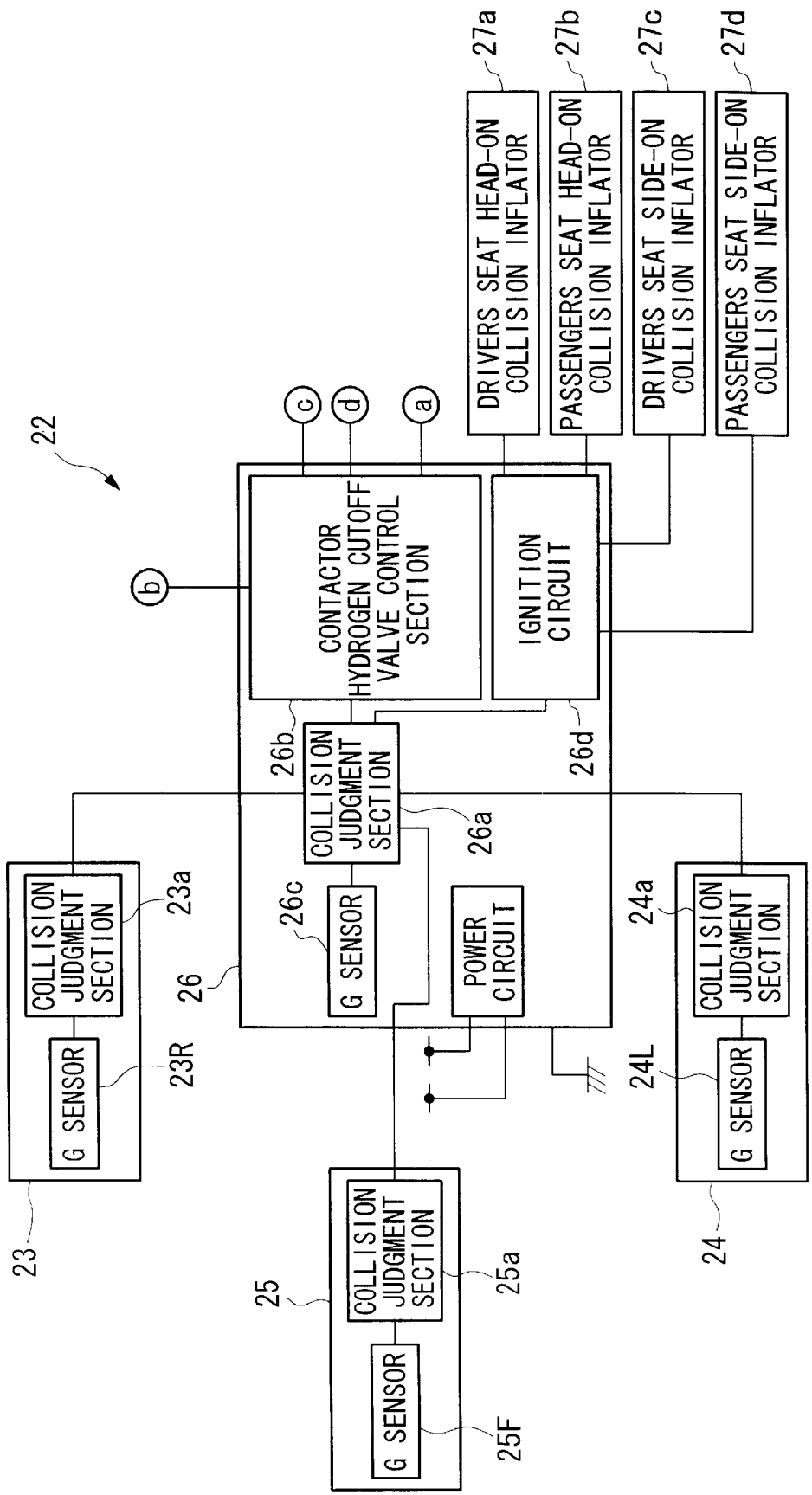
FIG. 2 is a block diagram of the apparatus for cutting off fuel of a fuel cell vehicle according to the embodiment of the present invention.
Figure 3:
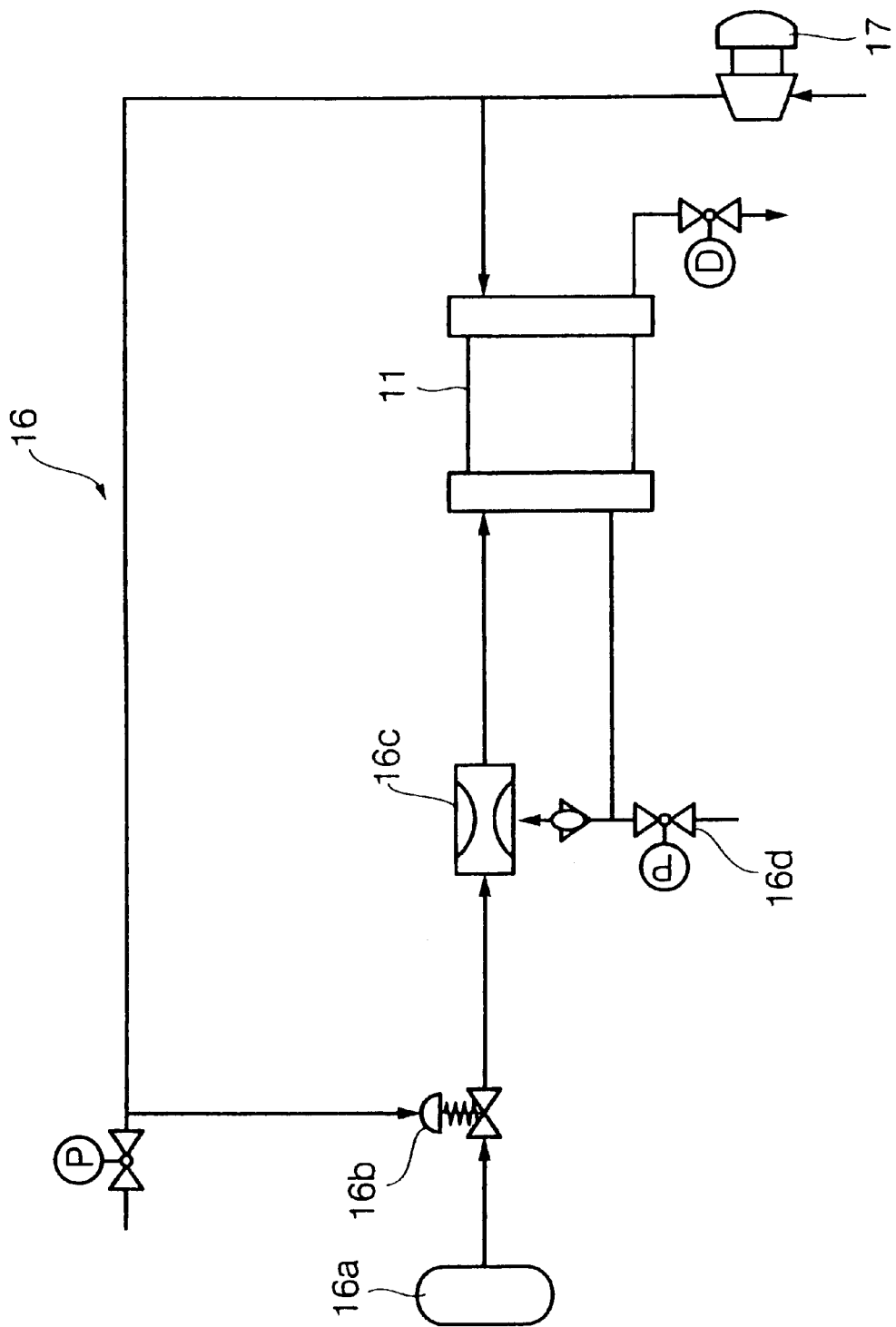
FIG. 3 is a block diagram of the main parts of a fuel supply section shown in FIG. 1.

FIG. 1 and FIG. 2 are block diagrams of a fuel cutoff apparatus 10 of a fuel cell vehicle according to an embodiment of the present invention, while FIG. 3 is a block diagram of the main parts of a fuel supply section 16 shown in FIG. 1.

The fuel cutoff apparatus 10 of a fuel cell vehicle according to the embodiment is furnished with a hybrid type power supply device comprising for example a fuel cell 11 and a power storage unit 12. A driving force for a propulsion motor 13 with power supplied from this power supply device, is transmitted to driving wheels (not shown in the figure) via a transmission (not shown in the figure) comprising an automatic transmission or a manual transmission. Furthermore, when at the time of deceleration of the fuel cell vehicle, a driving force is transmitted to the propulsion motor 13 side from the drive wheel side, the propulsion motor 13 functions as a generator to produce so called regenerative braking force, and the kinetic energy of the vehicle body is recovered as electrical energy.

As shown in FIG. 1 and FIG. 2, the fuel cutoff apparatus 10 of a fuel cell vehicle comprises a fuel cell 11, a power storage unit 12, a propulsion motor 13, an inverter 14, a motor ECU (Electronic Control Unit) 15, a fuel supply section 16, an air compressor 17, a compressor drive inverter 18, a power storage unit contact breaker 19a, a fuel cell contact breaker 19b and a propulsion motor contact breaker 19c, a hydrogen cutoff valve 20, a cutoff control section 21 (the above shown in FIG. 1), and a cutoff judgment section 22 (FIG. 2).

The propulsion motor 13 is a three phase AC synchronous motor of a permanent magnet type, which uses for example a permanent magnet as a field magnet, and is drive controlled by three phase AC power supplied from the inverter 14.

The inverter 14 is a PWM (Pulse Width Modulation) inverter comprising for example a switching element such as an IGBT (Insulated Gate Bipolar Transistor), and based on a torque command output from the motor ECU 15, converts DC power output from the fuel cell 11 and the power storage unit 12 into three phase AC power and supplies this to the propulsion motor 13.

The motor ECU 15 controls the power conversion operation of the inverter 14, and outputs to the inverter 14 as switching commands, respective AC voltage command values for a U-phase, a V-phase and a W-phase for example, so that the inverter 14 then outputs to each phase of the propulsion motor 13, a U-phase current, a V-phase current and a W-phase current corresponding to these respective voltage command values.

The fuel cell 11 is made up of a stack of solid polymer electrolyte membranes comprising for example a solid polymer ion-exchange membrane formed into cells with an anode and a cathode on opposite sides, with a plurality of these cells superimposed. The fuel cell 11 is provided with a fuel electrode to which hydrogen gas as a fuel is supplied, and an air electrode to which air containing oxygen as an oxidizing agent is supplied. The hydrogen ions generated at the anode by a catalytic reaction migrate through the solid polymer electrolyte membrane to the cathode, and at the cathode an electrochemical reaction occurs with the oxygen to produce electric power.

Moreover, as shown in FIG. 3, the fuel supply section 16 provided on the fuel electrode side of the fuel cell 11 incorporates a pressure flow control valve 16b for supplying hydrogen gas from the fuel tank 16a at a pressure corresponding to air supplied as a pressure signal for example from the air compressor 17.

Furthermore, the hydrogen gas supplied from the pressure flow control valve 16b is input to an ejector 16c, and discharged fuel discharged from a fuel discharge opening of the fuel cell 11 is introduced to an auxiliary flow chamber of the ejector 16c. Then the hydrogen gas supplied from the fuel tank 16a is accelerated by passing through the ejector 16c, so that the discharged fuel introduced to the auxiliary flow chamber is drawn into the high speed hydrogen gas flow and carried along. With this, a negative pressure is produced in the auxiliary flow chamber, and the discharged fuel is drawn into the auxiliary flow chamber to compensate for this negative pressure. Then, the hydrogen gas and discharged fuel mixed by the ejector 16c are supplied to the fuel electrode of the fuel cell 11, and the discharged fuel is circulated via the ejector 16c.

Furthermore, a leak valve 16d is provided in the fuel discharge opening of the fuel cell 11, and opening and closing of the leak valve 16d is controlled by the cutoff judgment section 22.

The power storage unit 12 constitutes a capacitor comprising for example an electric double layer capacitor or an electrolytic capacitor or the like, and is connected in parallel with the propulsion motor 13 being the electrical load, and transfers electrical energy with the fuel cell 11, and the propulsion motor 13.

Furthermore, accessories such as the air compressor 17 used for driving the fuel cell are connected in parallel with the fuel cell 11 and the power storage unit 12, and power supply thereto is effected corresponding to the operating conditions of the vehicle.

The DC electric power output from the fuel cell 11 and the power storage unit 12 is converted to AC power by the compressor drive inverter 18 constituted for example by a PWM inverter, and supplied to a motor Mc for driving the air compressor 17.

The power storage unit contact breaker 19a arranged on the output side of the power storage unit 12, the fuel cell contact breaker 19b arranged on the output side of the fuel cell 11, and the propulsion motor contact breaker 19c arranged on the input side of the inverter 14, comprise for example contactors, and respectively interrupt the electrical connection at positions where each contact breaker is provided, based on a control signal from the cutoff control section 21.

Furthermore, the hydrogen cutoff valve 20 is connected to the cutoff control section 21, for cutting off the hydrogen gas supplied from the fuel supply section 16, and interruption of fuel supply is controlled corresponding to a judgment result in the cutoff judgment section 22.

As shown in FIG. 2, the cutoff judgment section 22 comprises; a right side processing section 23 having a right side acceleration sensor 23R arranged at one side portion of the two mutually opposite sides of the vehicle, a left side processing section 24 having a left side acceleration sensor 24L arranged at the other side portion, a forward processing section 25 having a forward acceleration sensor 25F arranged at a front portion of the vehicle, and a central processing section 26 having a central acceleration sensor 26c arranged at a central portion of the vehicle.

The right side processing section 23, the left side processing section 24 and the forward processing section 25 all have for example the same construction, and incorporate respective collision judgment sections 23a, 24a and 25a for performing collision judgment based on acceleration signals output from each of the acceleration sensors 23R, 24L and 25F.

The right side acceleration sensor 23R and the left side acceleration sensor 24L detect the acceleration (or the deceleration) acting on the vehicle for example in a direction intersecting to the front-rear direction of the vehicle, while the forward acceleration sensor 25F and the central acceleration sensor 26c detect the acceleration (or deceleration) acting for example in the front-rear direction of the vehicle, and these output an acceleration signal G of a voltage level corresponding to the magnitude of the detected respective accelerations (or decelerations).

The central processing section 26 comprises a central acceleration sensor 26c, a collision judgment section 26a, a contactor hydrogen cutoff valve control section 26b, and an ignition circuit 26d.

The collision judgment section 26a performs collision judgment based on an acceleration signal G output from the central acceleration sensor 26c, and a signal for a judgment result output from the respective collision judgment sections 23a, 24a and 25a. For example, in the case where any one of the respective collision judgment sections 23a, 24a, and 25a judges a collision occurrence, or for example in the case where an acceleration is detected in the central acceleration sensor 26c which exceeds a predetermined acceleration (threshold acceleration), a collision occurrence signal is output to the contactor hydrogen cutoff valve control section 26b and the ignition circuit 26d.

The contactor hydrogen cutoff valve control section 26b controls the operation of each of the contact breakers 19a, 19b and 19c and the hydrogen cutoff valve 20, based on the signal for collision occurrence received from the collision judgment section 26a.

Then, as mentioned later, the contactor hydrogen cutoff valve control section 26b operates the power storage unit contact breaker 19a for example after a predetermined delay time, with respect to a timing where the electrical connections are cutoff by the fuel cell contact breaker 19b and the propulsion motor contact breaker 19c, and a timing where the supply of hydrogen gas is cutoff by the hydrogen cutoff valve 20.

The ignition circuit 26d generates a start signal for operating a passenger safety device such as for example an air bag unit, corresponding to a judgment result by the collision judgment section 26a. For example, connected to the ignition circuit 26d is a drivers seat head-on collision inflator 27a, a passengers seat head-on collision inflator 27b, a drivers seat side-on collision inflator 27c, and passengers seat side-on collision inflator 27d. A gas generating agent inside each of the inflators 27a to 27d is ignited by a squib (omitted from the figure) to generate gas from each of the inflators 27a to 27d, and by means of this gas the air bags are inflated to thereby prevent a secondary collision between the occupants and parts inside the cabin.

The fuel cutoff apparatus 10 of a fuel cell vehicle according to this embodiment incorporates the above mentioned construction. Next is a description of the operation of this fuel cutoff apparatus 10 of a fuel cell vehicle.

Figure 4:
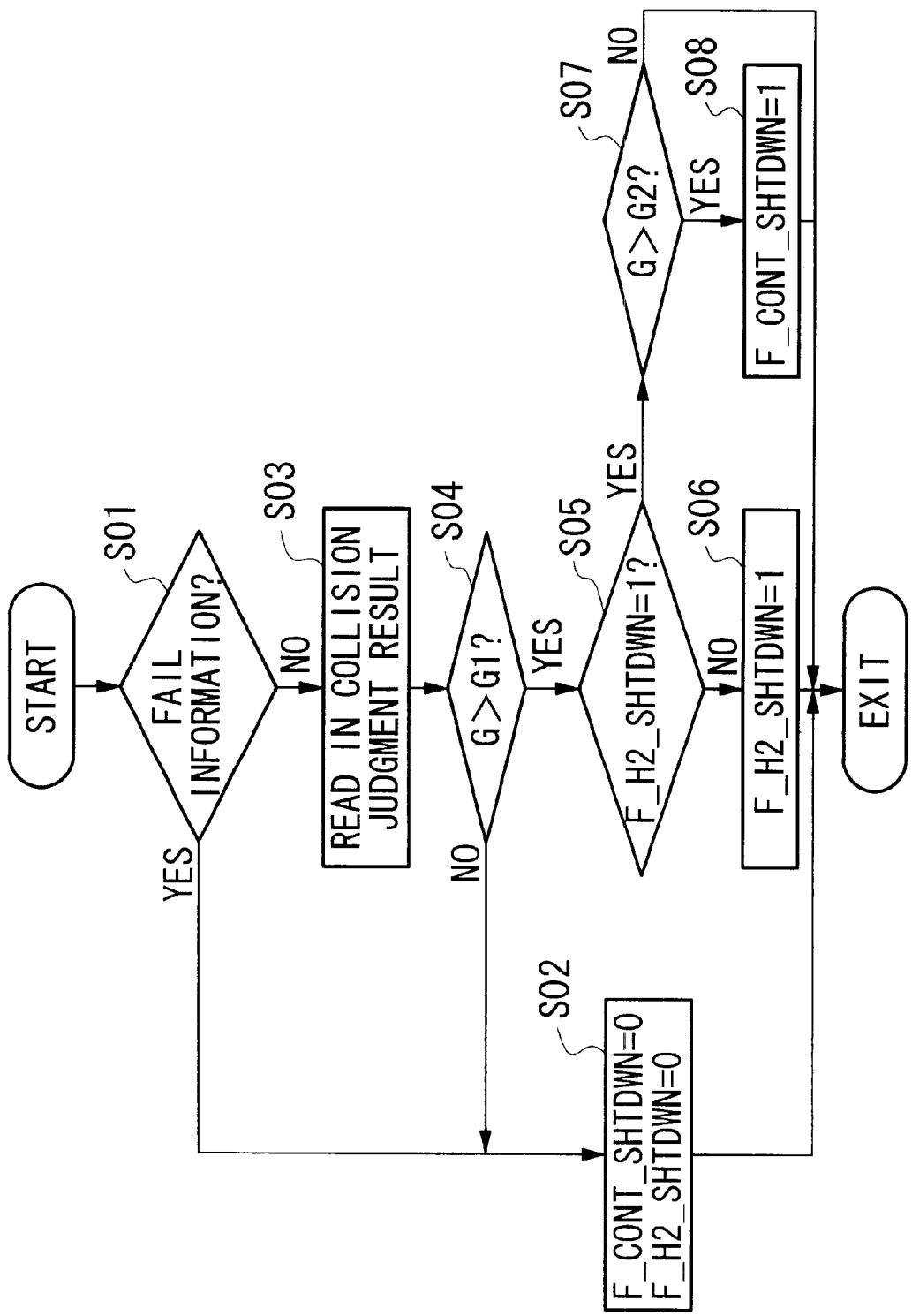
FIG. 4 is a flow chart showing the operation of the apparatus for cutting off fuel of a fuel cell vehicle, particularly showing a process for determining operation timing of a power storage unit contact breaker and a hydrogen cutoff valve.

FIG. 4 is a flow chart showing the processing for determining the operation of the fuel cutoff apparatus 10 of a fuel cell vehicle, and in particular the operation timing of the power storage unit contact breaker 19a and the hydrogen cutoff valve 20.

At first, in step S01 of FIG. 4, it is judged if fail information showing that there is some abnormality in the vehicle control system, has been detected.

In the case where the judgment result is "YES", control proceeds to step S02, where a "0" is set for a flag value of a flag F_CONT_SHTDWN indicating cutoff of the power supply from the power storage unit 12 by the power storage unit contact breaker 19a, and a "0" is set for a flag value of a flag F_H2_SHTDWN indicating closing of the hydrogen cutoff valve 20, and the series of processing is terminated.

On the other hand, in the case where the judgment result of step S01 is "NO", control proceeds to step S03, and each of the collision judgment sections 23a, 24a, 25a and 26a receive the acceleration signals G output from each of the acceleration sensors 23R, 24L, 25F, and 26c.

Then, in step S04, it is judged if for example for any of the collision judgment sections 23a, 24a, 25a and 26a, the acceleration signal G is greater than a first threshold acceleration G1.

In the case where the judgment result is "NO", the processing of step S02 and thereafter is performed.

On the other hand, in the case where the judgment result in step S04 is "YES", control proceeds to step S05, where it is judged if a flag value of the flag F_H2_SHTDWN indicating closing of the hydrogen cutoff valve 20 is "1".

In the case where the judgment result is "NO", control proceeds to step S06, where a "1" is set for the flag value of the flag F_H2_SHTDWN indicating closing of the hydrogen cutoff valve 20, and the series of processing is terminated.

On the other hand, in the case where the judgment result of step S05 is "YES", control proceeds to step S07, where it is judged if the acceleration signal G exceeds a predetermined second threshold acceleration G2 greater than the first threshold acceleration G1 for example.

In the case where the judgment result is "NO", the series of processing is terminated.

On the other hand, in the case where the judgment result of step S07 is "YES", control proceeds to step S08, where a "1" is set for the flag value of the flag F_CONT_SHTDWN indicating cutoff of the power supply from the power storage unit 12, and the series of processing is terminated.

That is to say, with respect to the acceleration signal G output from the acceleration sensor at the time of a collision occurrence of the vehicle, in the case where the acceleration signal G exceeds the relatively small first threshold acceleration G1, that is the supply of hydrogen gas is cutoff by the hydrogen cutoff valve 20 within a relatively short time from the collision occurrence, and in the case where the acceleration G exceeds the relatively large second threshold acceleration G2, that is the power storage unit contact breaker 19a is operated after an appropriate delay time from the cutoff of hydrogen gas, the air compressor 17 being the accessories for driving the fuel cell is stopped.

As a result, even in the case where for example immediately after a collision occurrence the output from the fuel cell 11 is cut off by the fuel cell contact breaker 19b, the hydrogen gas supplied to the fuel electrode of the fuel cell 11 is consumed so that the high pressure condition on the fuel electrode side is cancelled.

As described above, according to the fuel cutoff apparatus 10 of a fuel cell vehicle of the present embodiment, even in the case where the output from the fuel cell 11 is cutoff for example at the time of a collision occurrence of the vehicle, the hydrogen gas supplied to the fuel electrode of the fuel cell 11 is consumed so that the pressure of the hydrogen gas can be reduced. Therefore, the situation where an unbalance occurs with the pressure exceeding the tolerance between the fuel electrode and the air electrode is prevented, and can thus prevent the occurrence of deformation or damage etc. of the solid polymer electrolyte membrane inside the fuel cell 11, and contribute to the prolongation of the life span of the fuel cell 11.

Figure 5:
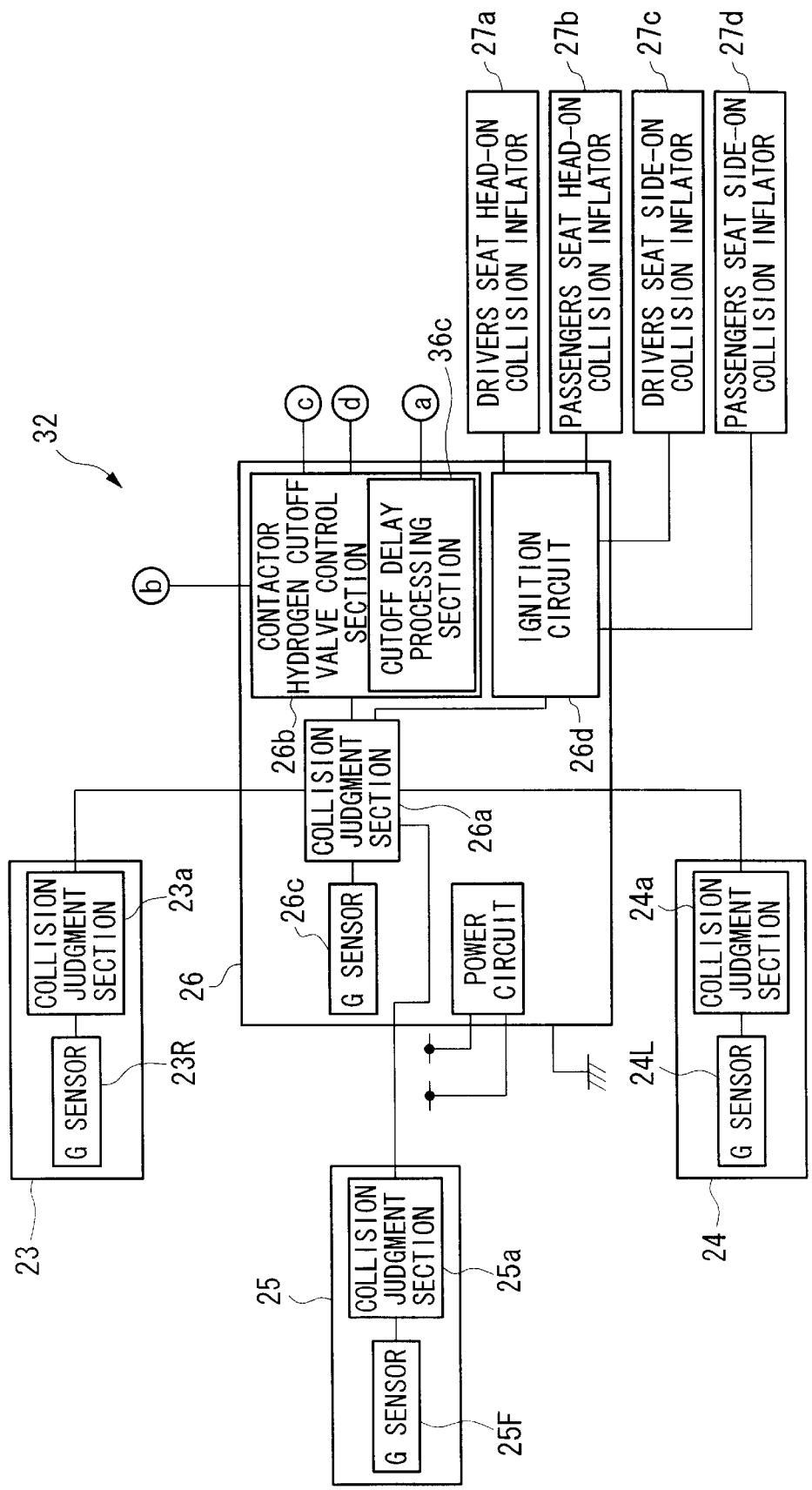
FIG. 5 is a block diagram of a cutoff judgment section related to a first modified example of the apparatus for cutting off fuel of a fuel cell vehicle of the embodiment of the present invention shown in FIG. 2.

In this embodiment, the operation of each of the contact breakers 19a, 19b and 19c and the hydrogen cutoff valve 20 is controlled in accordance with the judgment result in the cutoff judgment section 22. However the invention is not limited to this, and for example as with the block diagram shown in FIG. 5 of a cutoff judgment section 32 according to a first modified example of the fuel cutoff apparatus 10 of a fuel cell vehicle of this embodiment, a cutoff delay processing section 36c may be provided.

That is to say, in the case where the electrical connection is cut off by the fuel cell contact breaker 19b and the propulsion motor contact breaker 19c, and the supply of hydrogen gas is cutoff by the hydrogen cutoff valve 20, the cutoff delay processing section 36c operates the power storage unit contact breaker 19a after a predetermined delay time.

Figure 6:
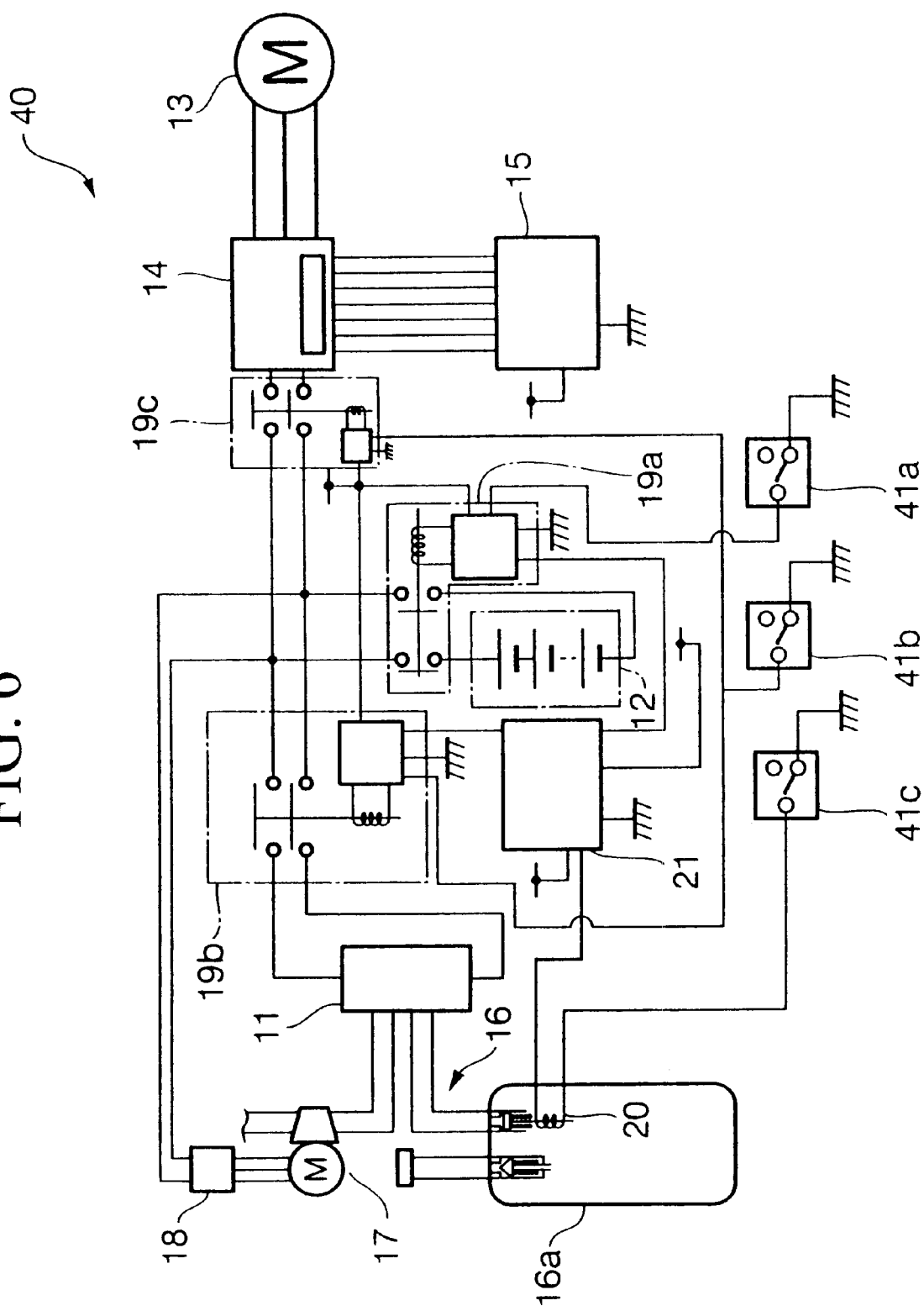
FIG. 6 is a block diagram of an apparatus for cutting off fuel of a fuel cell vehicle related to a second modified example of the embodiment of the present invention.

Furthermore, in this embodiment, the operation of the respective contact breakers 19a, 19b and 19c and the hydrogen cutoff valve 20 is controlled in accordance with the judgment result in the cutoff judgment section 22. However the invention is not limited to this, and for example as with the block diagram shown in FIG. 6 of a fuel cutoff device 40 of a fuel cell vehicle according to a second modified example of the embodiment, the operation of each of the contact breakers 19a, 19b and 19c and the hydrogen cutoff valve 20 may be controlled by a plurality of inertia switches.

Here, each of the inertia switches 41a, 41b and 41c incorporates a moving part comprising a magnetic body, and a holding part for holding this moving part by magnetic force. The construction is such that in the case where a shock is applied exceeding the magnetic force of the holding part, due to shock at the time of a vehicle collision, the moving part released from the holding part is displaced so as to push up against a moving contact so that the conduction is cutoff.

Moreover, the construction is such that the inertia switch 41a controls the power storage unit contact breaker 19a, the inertia switch 41b controls the fuel cell contact breaker 19b and the propulsion motor contact breaker 19c, and the inertia switch 41c controls the hydrogen cutoff valve 20.

Here, the magnetic force of the holding part of the inertia switch 41a which controls the power storage unit contact breaker 19a is set to be greater than the magnetic force of the holding part of the inertia switch 41c which controls the hydrogen cutoff valve 20. Hence, at the time of a vehicle collision, at first the hydrogen cutoff valve 20 is closed at the time when a relatively small shock acts, and after this, when a relatively large shock acts, the power storage unit contact breaker 19a is operated so that the power supply to the accessories such as the air compressor 17 for driving the fuel cell is stopped.

In this embodiment, the power storage unit contact breaker 19a, the fuel cell contact breaker 19b and the propulsion motor contact breaker 19c comprise contactors. However they are not limited to this, and each of the contact breakers 19a, 19b, 19c may be for example breakers, or fuses which detonate a gunpowder thereinside to cutoff a conducting portion.

Furthermore, in the present embodiment, the power storage unit contact breaker 19a is operated after the cutoff of the electrical connection by the fuel cell contact breaker 19b, the cutoff of the electrical connection by the propulsion motor contact breaker 19c and the cutoff of the supply of hydrogen gas by the hydrogen cutoff valve 20. However this is merely an example and the invention is not limited to this form. In other words, after cutoff of the supply of hydrogen gas by the hydrogen cutoff valve 20, one or both of the power storage unit contact breaker 19*a* and the propulsion motor contact breaker 19*c* may be operated.

What is claimed is:

1. An apparatus for cutting off fuel of a fuel cell vehicle having a solid polymer type fuel cell which includes an air electrode to which air is supplied and a solid polymer electrolyte membrane and which circulates said fuel by returning said fuel from a fuel outlet of said fuel cell to a fuel inlet of said fuel cell, comprising:

an acceleration detector which detects an acceleration acting on a fuel cell vehicle having a fuel cell power generation system as a power supply;

a power supply cutoff section which cuts off at least one of a power supply line of a propulsion system of said fuel cell vehicle, and a power supply line of an accessory drive system of said fuel cell power generation system;

a fuel supply cutoff section which cuts off fuel supplied from a fuel supply device to said fuel cell of said fuel cell power generation system; and a cutoff control section which operates said power supply cutoff section after said fuel supply cutoff section has been operated, based on said acceleration detected in said acceleration detector.

2. An apparatus for cutting off fuel of a fuel cell vehicle according to claim 1, wherein said cutoff control section comprises a delay section which delays operation of said power supply cutoff section for a predetermined time after said fuel supply cutoff section has been operated.

3. An apparatus for cutting off fuel of a fuel cell vehicle according to claim 1, wherein said cutoff control section comprises:

a first judgment device which judges if said acceleration exceeds a predetermined first threshold acceleration, a second judgment device which judges if said acceleration exceeds a predetermined second threshold acceleration larger than said first threshold acceleration, a fuel supply cutoff control section which operates said fuel supply cutoff section in accordance with a judgment result from said first judgment device, and a power supply cutoff control section which operates said power supply cutoff section in accordance with a judgment result from said second judgment device.

4. A method of cutting off fuel of a fuel cell vehicle having a solid polymer type fuel cell which includes an air electrode to which air is supplied and a solid polymer electrolyte membrane and which circulates said fuel by returning said fuel from a fuel outlet of said fuel cell to a fuel inlet of said fuel cell, comprising the steps of:

an acceleration detection step for detecting an acceleration acting on a fuel cell having a fuel cell power generation system as a power supply;

a fuel supply cutoff step for cutting off fuel supply from a fuel supply device to said fuel cell of said fuel cell power generation system based on said acceleration detected in said acceleration detection step; and a power supply cutoff step for cutting off at least one of a power supply line of a propulsion system of said fuel cell vehicle, and a power supply line of an accessory drive system of said fuel cell power generation system, after said fuel supply cutoff step has been executed, based on said acceleration detected in said acceleration detection step.

5. A method of cutting off fuel of a fuel cell vehicle according to claim 4, wherein said power supply cutoff step is executed after a predetermined time has elapsed from after execution of said fuel supply cutoff step.

6. A method of cutting off fuel of a fuel cell vehicle according to claim 4, wherein said fuel supply cutoff step involves judging if said acceleration has exceeded a predetermined first threshold acceleration, and in the case where said acceleration has exceeded said first threshold acceleration, cutting off fuel supply from said fuel supply device to said fuel cell, and said power supply cutoff step involves judging if said acceleration has exceeded a predetermined second threshold acceleration greater than said first threshold acceleration, and in the case where said acceleration has exceeded said second threshold acceleration, cutting off said power supply line.

* * * * *